3,234,094
17-[ω-TETRAHYDROFURYL-(2)-ACETIC ACID ESTERS] OF ESTROGENIC HORMONES
Rudolf Watzel, Nieder Ramstadt-Trautheim, Germany, assignor to E. Merck Aktiengesellschaft, Darmstadt, Germany
No Drawing. Filed July 15, 1963, Ser. No. 295,182
Claims priority, application Germany, July 17, 1962, M 53,594
13 Claims. (Cl. 167—74)

This invention relates to estrogenic steroids, particularly to novel esters of estradiol.

Estradiol was first isolated in 1935, and since that date various estrogenic derivatives thereof have been synthesized. For example, estradiol-17β-cyclopentyl-propionate has been found to be an active substance of this group. It is to be appreciated, moreover, that the medical profession is always desirous of obtaining more efficacious compounds, not only from the pharmacological standpoint, but also for the purpose of reducing the overall cost of treatment to the patient.

The object of the present invention, therefore, is to provide new estradiol esters having enhanced as well as prolonged estrogenic activities.

Another object is to provide processes for the preparation of these novel esters.

A further object is to provide novel intermediates in the preparation of these esters.

Still another object is to provide pharmaceutical preparations as well as methods of administration, based on the active estrogenic steroids of this invention.

Upon further study of the specification and claims, other objects and advantages of the present invention will become apparent.

To achieve the objects of this invention, it has been unexpectedly discovered that the administration of 17-[ω-tetrahydrofuryl-(2)-fatty acid esters] of estradiol to mammals yields superior estrogenic activities. The fatty acid portion of these esters preferably contains 2–4 carbon atoms, thereby the species are as follows:

Estradiol-17[ω-tetrahydrofuryl-(2)-acetic acid ester]
Estradiol-17-[ω-tetrahydrofuryl-(2)-propionic acid ester] and
Estradiol-17-[ω-tetrahydrofuryl-(2)-butyric acid ester]

The improved properties of these estrogenic steroids are demonstrated by the following typical example.

Castrated female rats were treated intramuscularly with the given dosis of an estradiol 17-ester dissolved in up to 1 ml. of peanut oil. The "average duration of estrus" is defined as the number of days during which full estrus was exhibited by at least 50% of the animals tested.

| | Estradiol 17-Ester | |
| --- | --- | --- |
| | β-Cyclopentyl-propionate | ω-Tetrahydro-furyl-2-pro-pionate |
| Dosis in micrograms | Average duration of estrus in days | |
| 100 | 44 | [1] >60 |
| 5 | 12 | 21 |
| 1 | No full estrus | 4 |

[1] The experiment was not continued after 60 days of observation

Thus, it is shown that the application of estradiol-17-[ω-tetrahydrofuryl-(2)-propionate] produces an estrus of longer duration than that produced by estradiol-17-β-cyclopentyl propionate.

These new estradiol esters of this invention are especially suitable for parenteral administration, e.g., subcutaneous or intramuscular, preferably in pharmaceutical liquid carriers, e.g., fatty oils such as peanut or olive oil, or glycols or their ethers or esters, mixed if necessary with alcohol and water as a solution or suspension. A mixture of propylene glycol, alcohol and water in a weight ratio of 1.5:4.5:4 has been found to be particularly suitable. The ampoules contain generally 5–50 mg. preferably 10 mg. of the active material per ml. The unit dosage for mammals is in the range of 1 to 10 mg.

To product the novel esters of this invention, estradiol is alternatively esterified in conventional manner with a ω-tetrahydrofuryl-(2)-fatty acid containing a total of 6 to 8 carbon atoms, or with a functional derivative thereof which is suitable for esterification, or by hydrolytically or reductively liberating, in a conventional manner, the hydroxyl group in the 3-position of a 3-ester or a 3-ether of a 17-[ω-tetrahydrofuryl-(2)-fatty acid ester] of estradiol.

Suitable ω-tetrahydrofuryl-(2)-fatty acids with a total of 6 to 8 carbon atoms are tetrahydrofuryl-(2)-acetic acid, β-[tetrahydrofuryl-(2)] propionic acid and γ-[tetrahydrofuryl-(2)] butyric acid.

The esterification of estradiol can be undertaken by known methods with the free ω-tetrahydrofuryl-(2)-fatty acid itself, or with a suitable derivative of this acid, e.g., its chloride or anhydride, or by interchange of ester radicals, beginning with a lower aliphatic ester of ω-tetrahydrofuryl-(2)-fatty acid, e.g. the methyl- or ethyl-ester thereof.

If the free ω-tetrahydrofuryl-(2)-fatty acid is used as the esterification material, then the reaction is preferably conducted in an inert organic solvent such as benzene or toluene, and if necessary in the presence of acid catalysts such as p-toluene sulfonic acid or boron trifluoride. It is advisable to remove the water that is produced by this reaction by azeotropic distillation.

If an acid halide, e.g., ω-tetrahydrofuryl-(2)-propionyl-chloride is used as the esterification reagent, then the estradiol can be treated for a while with a mixture of the acid halide and a base, e.g., dilute sodium hydroxide solution or pyridine, and if necessary, in the presence of an inert solvent such as benzene, and/or with the application of heat. As an intermediate product the 3,17-diester estradiol is produced, from which the desired 17-monoester is separated by known methods, e.g., by crystallization or chromatography.

For esterification, it is also possible to use the anhydride of a ω-tetrahydrofuryl-(2)-fatty acid, possibly in the presence of a base, e.g., dilute sodium hydroxide or pyridine, and if necessary, in an inert organic solvent such as benzene. It is preferable to continue the reaction to completion, as by heating or boiling.

The esterification can also be accomplished by reaction of the estradiol with a lower aliphatic ester of ω-tetrahydrofuryl-(2)-fatty acid. This ester can itself serve as the solvent, but can also be employed in the presence of an inert solvent whose boiling point is preferably higher than that of the alcoholic portion of the ester, or which will form an azeotropic mixture with such alcohol. The lower aliphatic alcohol which is formed by this reaction is distilled off from the reaction mixture, whereby the equilibrium will be shifted in favor of the desired 17-[ω-tetrahydrofuryl-(2)-fatty-acid esters] of estradiol. The reaction will proceed at room temperature, but the use of heat is preferable.

The process of this invention can also be commenced with a 3-ester of 17-[ω-tetrahydrofuryl-(2)-fatty-acid ester] of estradiol. Such 3,17-diester of estradiol can be partially hydrolyzed in the 3-position. Such partial saponification is made possible by the fact that phenol esters can be saponified more readily than the esters of secondary alcohols. It is performed in a known manner, preferably by reaction with a base such as sodium bicarbonate, potassium carbonate or potassium acetate, or also with an acid such as dilute sulfuric or hydrochloric acid. The work is preferably done in a mixture of water, and acetone or a lower aliphatic alcohol, or in the presence of such alcohol alone. It is generally advisable to use mild conditions so as not to hydrolyze the 17-acyl-groups simultaneously, the reaction being therefore preferably conducted at room temperature. Mild warming, however, is not detrimental to the reaction. Suitable esters for this reaction are, e.g., the 3-acetate, 3-benzoate or 3-p-toluene-sulfonate of estradiol-17-[ω-tetrahydrofuryl-(2)-fatty acid esters] or also an estradiol-3,17-bis-[ω-tetrahydrofuryl-(2)-fatty-acid ester]. It is also possible to effect a partial reductive splitting of such diester, e.g., with lithium tetrahydride aluminate.

It is also possible to begin with a 3-ether-17-[ω-tetrahydrofuryl-(2)-fatty-acid ester] of estradiol. The splitting of such an ether is effected in a conventional manner and under conditions which would not simultaneously cause the 17-acetyl group to become separated. Use is preferably made of those 3-ethers which can be readily split off, as e.g., the 3-methoxymethyl, 3-tetrahydropyranyl, 3-triphenylmethyl or 3-benzyl ether. The cleavage can be effected by acid hydrolysis, e.g., with aqueous alcoholic or alcoholic mineral acid. The reaction mixture is preferably warmed or heated.

Ethers of the type of 3-benzyl ether can also be split hydrogenolytically. The hydrogenolytic splitting is accomplished by means of catalytically activated hydrogen. The usual catalysts are used, such as the noble metal catalysts, but also Raney-nickel or Raney-cobalt. The catalysts can be in the form of oxide- or carrier-catalysts, or as finely divided metal catalysts. For example, palladium oxide or platinum black can be used. The work is preferably done in the presence of an inert solvent such as methanol or ethanol. For this hydrogenation, the conditions should not be too severe, so as not to attack the aromatic A ring of the estradiol.

The required starting materials for this invention can be obtained in a known manner by esterification of estradiol itself or of a 3-ether or a 3-ester thereof.

The novel intermediates of this invention are:

Estradiol-3,17-[ω-tetrahydrofuryl-(2)-acetic acid ester]
Estradiol-3,17-bis[ω-tetrahydrofuryl-(2)-propionic acid ester]
Estradiol-3,17-bis[ω-tetrahydrofuryl-(2)-butyric acid ester]
Estradiol-17-bis[ω-tetrahydrofuryl-(2)-acetic acid ester]-3-benzyl ether
Estradiol-17-[ω-tetrahydrofuryl-(2)-propionic acid ester]-3-benzyl ether
Estradiol-17-[ω-tetrahydrofuryl-(2)-butyric acid ester]-3-benzyl ether
Estradiol-17-[ω-tetrahydrofuryl-(2)-acetic acid ester]-3-acetate
Estradiol-17-[ω-tetrahydrofuryl-(2)-propionic acid ester]-3-acetate
Estradiol-17-[ω-tetrahydrofuryl-(2)-butyric acid ester]-3-acetate
Estradiol-17-[ω-tetrahydrofuryl-(2)-acetic acid ester]-3-benzoate
Estradiol-17-[ω-tetrahydrofuryl-(2)-propionic acid ester]-3-benzoate
Estradiol-17-[ω-tetrahydrofuryl-(2)-butyric acid ester]-3-benzoate
Estradiol-17-[ω-tetrahydrofuryl-(2)-acetic acid ester]-3-p-toluene-sulfonate
Estradiol-17-[ω-tetrahydrofuryl-(2)-propionic acid ester]-3-p-toluene-sulfonate
Estradiol-17-[ω-tetrahydrofuryl-(2)-butyric acid ester]-3-p-toluene-sulfonate Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

15 g. estradiol are dissolved in 500 ml. β-[tetrahydrofuryl-(2)]-propionic-acid methyl ester and after an addition thereto of 15 g. p-toluene sulfonic acid and 300 ml. cyclohexane are heated 3 hours to slow boiling. 230 ml. of an azeotropic mixture are thereby distilled off. 300 ml. cyclohexane are then added and the mixture heated another 1½ hours, whereby a further 220 ml. are distilled off. After removal of the solvent in a vacuum, the residue is recrystallized twice from methanol to obtain 4 g. estradiol-17β-[β-tetrahydrofuryl-(2)]-propionic-acid ester, M.P. 191–193° C. From the mother liquor an additional 2 to 3 g. of the 17-ester can be obtained.

The β-[tetrahydrofuryl-(2)] - propionic-acid methyl ester can be obtained by esterification of tetrahydrofuryl-(2)-propionic acid. (See Organic Synthesis, vol. 27, p. 68 (1947).)

Example 2

By analogy to Example 1, estradiol and γ-[tetrahydrofuryl-(2)]-butyric-acid methyl ester are reacted to obtain estradiol-17β-[α-tetrahydrofuryl-(2)-butyric-acid ester].

Example 3

1 g. estradiol-17β-[β-tetrahydrofuryl-(2)-propionate]-3-benzyl ether are dissolved in a mixture of 100 ml. ethanol and 30 ml. toluene, and are hydrogenated at room temperature in the presence of palladium charcoal with continual agitation until no more hydrogen is absorbed. After separation of the catalyst by filtration, the solvent is distilled in vacuum and the residue recrystallized from methanol to yield estradiol-17β-[β-tetrahydrofuryl-(2)-propionic ester].

Example 4

2.72 g. estradiol are dissolved in 30 ml. dry pyridine and after cooling are reacted dropwise with 3.88 g. ω-[tetrahydrofuryl-(2)]-butyric-acid-chloride (B.P. 100–105° C.). After standing several hours at room temperature, the reaction mixture is poured into ice cold dilute hydrochloric acid, and the precipitated diester is vacuum filtered, and washed with water.

For partial saponification, the raw diester is warmed 2–3 hours on a steam bath with 1 g. potassium acetate in 500 ml. methanol. Most of the solvent is then distilled off in a vacuum and the residue taken up in ether and prepared in the usual manner. The estradiol-17β-[γ-tetrahydrofuryl-(2)]-butyric acid ester is then obtained by recrystallization from methanol.

The ω-[tetrahydrofuryl-(2)]-butyric-acid-chloride is obtained from ω-tetrahydrofuryl-(2)-butyric acid (see J. Am. Chem. Soc., vol. 75, p. 1275 (1953)) by heating with thionyl chloride.

Example 5

3.6 g. estradiol-3-benzoate are dissolved in 150 ml. dry pyridine. Into this solution is added drop-by drop at temperatures not over 10° C. a solution of 1.86 g. tetrahydrofuryl-acetyl-chloride in 10 ml. dry benzene. The mixture is allowed to stand over night and is then diluted with water and extracted with ether. After being worked up in the usual manner, estradiol-3-benzoate-17-tetrahydrofuryl-acetate is obtained.

The raw diester is suspended in methanol and is reacted at room temperature with a solution of potassium carbonate in 90% aqueous methanol. It is preferable to use only a slight excess of $K_2CO_3$, just sufficient to saponify the benzoate. The mixture is agitated 3 hours at room temperature and is then diluted with water and the estradiol-17β-tetrahydrofuryl acetate isolated in the usual manner.

The required tetrahydrofuryl-(2)-acetic acid is obtained from 2-bromo-methyl-tetrahydrofuran by reaction with sodium cyanide and saponification of the nitrile thus produced. To produce the chloride, the acid is treated by a known manner with thionyl chloride.

The following examples represent preferred pharmaceutical compositions of this invention.

*Example 6*

Solution for injection purposes.

1 g. estradiol-17-[ω-tetrahydrofuryl-(2)-acetate] is dissolved in 100 ml. peanut oil. Ampoules are filled with 1 ml. of this solution each and are sterilized in the usual manner.

Likewise, solutions of estradiol-17-[ω-tetrahydrofuryl-(2)-propionate] or estradiol-17-[ω-tetrahydrofuryl-(2)-butyrate] can be prepared.

*Example 7*

Solution for injection purposes.

1 g. estradiol-17-[ω-tetrahydrofuryl-(2)-acetate] is dissolved in a mixture of 15 g. propylene glycol and 45 g. ethyl alcohol. 40 g. water is added to this solution which is then transferred into ampoules as described in example 6.

Likewise, solutions of estradiol-17-[ω-tetrahydrofuryl-(2)-propionate] or estradiol-17-[ω-tetrahydrofuryl-(2)-butyrate] can be prepared.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following cliams.

What is claimed is:

1. Estradiol-17-[ω-tetrahydrofuryl-(2)-acetic acid ester].
2. Estradiol-17[ω-tetrahydrofuryl-(2)-propionic acid ester].
3. Estradiol-17-[ω-tetrahydrofuryl-(2)-butyric acid ester].
4. A pharmaceutical composition in unit dosage form for parenteral administration comprising a liquid pharmaceutical carrier and 1–10 mg. estradiol-17-[ω-tetrahydrofurly-(2)-acetic acid ester] in a concentration 5–50 mg./ml. of solution.
5. A pharmaceutical composition in unit dosage form for parenteral administration comprising a liquid pharmaceutical carrier and 1–10 mg. estradiol-17-[ω-tetrahydrofuryl-(2)-propionic acid ester] in a concentration of 5–50 mg./ml. of solution.
6. A pharmaceutical composition in unit dosage form for parenteral administration comprising a liquid pharmaceutical carrier and 1–10 mg. estradiol-17-[ω-tetrahydrofuryl-(2)-butyric acid ester] in a concentration of 5–50 mg./ml. of solution.
7. A process for effecting estrogenic activity in mammals, which process comprises administering an effective dosage of estradiol-17-[ω-tetrahydrofuryl-(2)-acetic acid ester].
8. A process for effecting estrogenic activity in mammals, which process comprises administering an effective dosage of estradiol-17-[ω-tetrahydrofuryl-(2)-propionic acid ester].
9. A process for effecting estrogenic activity in mammals, which process comprises administering an effective dosage of estradiol-17-[ω-tetrahydrofuryl-(2)-butyric acid ester].
10. A member of the group consisting of estradiol-17-[ω-tetrahydrofuryl-(2)-acetic acid ester]-3-benzyl ether, estradiol-17-[ω-tetrahydrofuryl(2)-propionic acid ester]-3-benzyl ether, and estradiol-17-[ω-tetrahydrofuryl-(2)-butyric acid ester]-3-benzyl ether.
11. A member of the group consisting of estradiol-17-[ω-tetrahydrofuryl-(2)-acetic acid ester]-3-acetate, estradiol-17-[ω-tetrahydrofuryl-(2)-propionic acid ester]-3-acetate, and estradiol-17-[ω-tetrahydrofuryl-(2)-butyric acid ester]-3-acetate.
12. A member of the group consisting of estradiol-17-[ω-tetrahydrofuryl-(2)-acetic acid ester]-3-benzoate, estradiol-17[ω-tetrahydrofuryl-(2)-propionic acid ester]-3-benzoate, and estradiol-17-[ω-tetrahydrofuryl-(2)-butyric acid ester]-3-benzoate.
13. A member of the group consisting of estradiol-17-[ω-tetrahydrofuryl-(2)-acetic acid ester]-3-p-toluene-sulfonate, estradiol-17-[ω-tetrahydrofuryl-(2)-propionic acid ester]-3-p-toluene-sulfonate, and estradiol-17-[ω-tetrahydrofuryl-(2)-butyric acid ester]-3-p-toluene-sulfonate.

References Cited by the Examiner

UNITED STATES PATENTS 2,842,567  7/1958  Haack et al. _____ 260—397.4

FOREIGN PATENTS 505,029  5/1939  Great Britain.
506,252  5/1939  Great Britain.

OTHER REFERENCES

"The Furans," by Dunlop and Peters, published by Reinhold Publishing Corp. (1953), New York, p. 589 relied on.

LEWIS GOTTS, *Primary Examiner.*